United States Patent [19]
Altwasser

[11] Patent Number: 5,797,132
[45] Date of Patent: Aug. 18, 1998

[54] INFORMATION DISPLAY SYSTEM FOR DISPLAYING INFORMATION SUCH AS PRICING INFORMATION ON SHELVES CONTAINING RETAIL MERCHANDISE

[75] Inventor: Richard Altwasser, Forst bei Bruchsal, Germany

[73] Assignee: Pricer AB, Upsala, Sweden

[21] Appl. No.: 551,562

[22] Filed: Nov. 1, 1995

[30] Foreign Application Priority Data

Nov. 2, 1994 [DE] Germany ............ 44 39 074.2

[51] Int. Cl.$^6$ ................................ G06F 17/60
[52] U.S. Cl. ............................ 705/16; 705/20
[58] Field of Search ................. 235/383, 385; 395/220; 40/642; 705/20, 21, 16, 1

[56] References Cited

U.S. PATENT DOCUMENTS

| | | | |
|---|---|---|---|
| 5,241,542 | 8/1993 | Natarajan et al. | |
| 5,299,117 | 3/1994 | Farnbach | |
| 5,348,485 | 9/1994 | Briechle et al. | 439/110 |
| 5,374,815 | 12/1994 | Waterhouse et al. | 235/383 |
| 5,473,146 | 12/1995 | Goodwin, III | 235/383 |
| 5,510,602 | 4/1996 | Evans et al. | 235/385 |
| 5,532,465 | 7/1996 | Waterhouse et al. | 235/383 |
| 5,553,412 | 9/1996 | Briechle et al. | 40/642 |

FOREIGN PATENT DOCUMENTS

| | | |
|---|---|---|
| 0303020 | 2/1989 | European Pat. Off. |
| 0396414 | 11/1990 | European Pat. Off. |
| 0447278 | 9/1991 | European Pat. Off. |
| 0529269 | 3/1993 | European Pat. Off. |
| 0604382 | 6/1994 | European Pat. Off. |
| 3135028 | 4/1983 | Germany |
| 3731852 | 5/1988 | Germany |
| 2189637 | 10/1987 | United Kingdom |
| 8602477 | 4/1986 | WIPO |
| 9013067 | 11/1990 | WIPO |
| 9216901 | 10/1992 | WIPO |

OTHER PUBLICATIONS

"Supermarket go high tech with electronic shelf labels" by Rice Electronic Business vol. 14, No. 17, pp. 16–36; Sep. 1, 1988.
"Fiesta Mart to test radio shelf labeling" by Zimmerman Supermarket News, v45, n6, p. 9; Feb. 6, 1995.
"Shelf labels go electronic . . . "; Fensholt Supermarket Business, v43, n5, p. 46 May 1988.
"Electronic shelf tags aglow in 2 units" by Hall Supermarket News, v37, n49, p. 43; Dec. 7, 1987.
"Will Supermarkets Play Electronic Tag?"; Garry, M. Progressive Grocer; v70 n7, pp. 99–104; Jul. 1991.

Primary Examiner—Robert A. Weinhardt
Attorney, Agent, or Firm—Nils H. Ljungman and Associates

[57] ABSTRACT

The invention is directed to an electronic labelling system such as for display pricing information on the edge of shelves in retail supermarkets which system comprises a computer (1), a transceiver (2) connected thereto, as well as electronic tags (4) preferably fixed to shelves, with the transceiver (2) transmitting, by means of electromagnetic waves (5), communications frames to update the tags (4), said frames holding the specific address (7) of a tag (4) as well as the data (8) to be displayed, said tags (4) including a receiver which is periodically activated to receive the communications frames. To reduce the power consumption of the tags (4), it is suggested that the tags (4) comprise devices for synchronizing the receivers, said devices activating the receivers at the same instant in time when a communications frame is being transmitted from the transceiver (2).

20 Claims, 11 Drawing Sheets

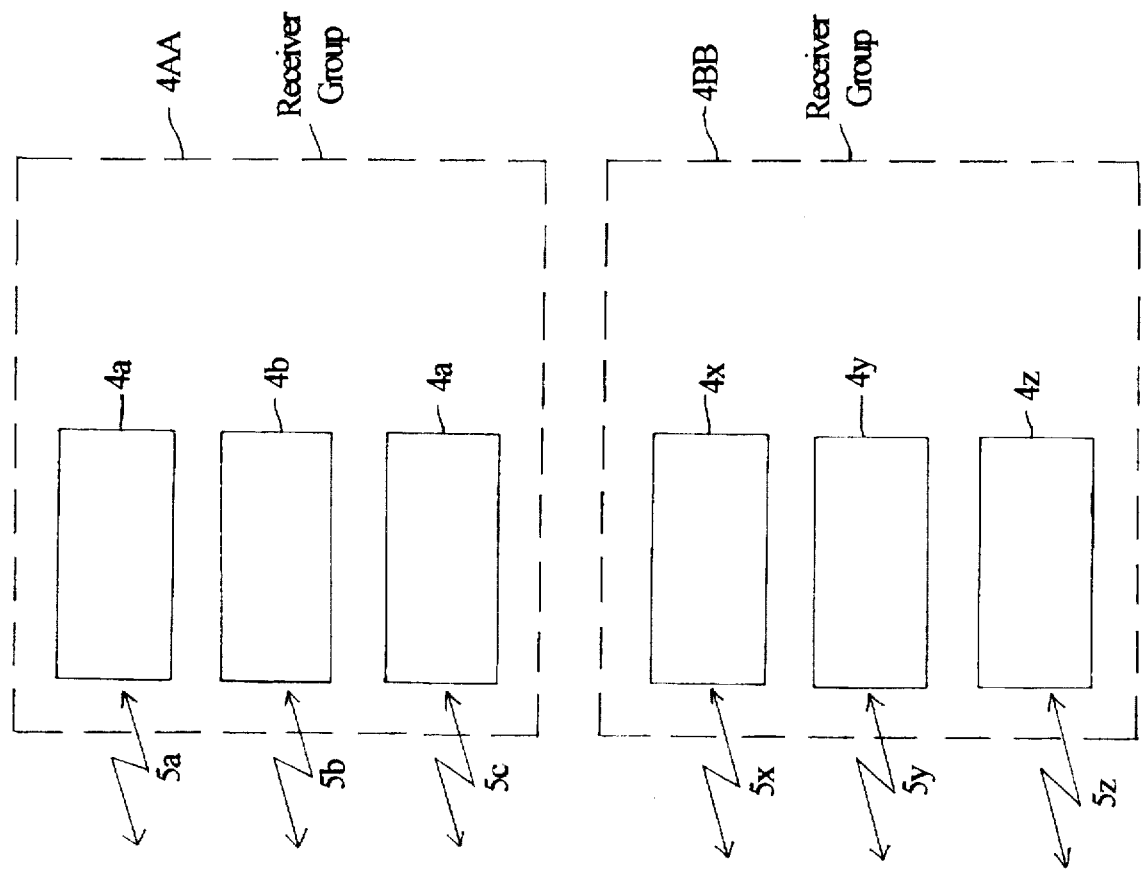

5,797,132

INFORMATION DISPLAY SYSTEM FOR DISPLAYING INFORMATION SUCH AS PRICING INFORMATION ON SHELVES CONTAINING RETAIL MERCHANDISE

BACKGROUND OF THE INVENTION

1. Field of the Invention

This invention relates to an electronic labelling system, comprising a computer, a transceiver connected thereto, as well as electronic tags preferably fixed to shelves, with the transceiver transmitting, by means of electromagnetic waves, communications frames to update the tags, the frames containing the specific address of a tag as well as the data to be displayed, the tags incorporating a receiver which is periodically activated to receive the communications frames.

2. Background Information

Electronic labelling systems generally comprise a large number of electronic tags that are fixed, for example, to the edge of shelves in retail stores and display price, and possibly also other merchandising information about the product being offered for sale on the shelf. Each tag is in communication with a central computer storing a file which holds the current price and the number of each article being offered for sale. The main advantage of electronic labelling systems over conventional, non-electronic tags fixed to the edge of shelves is that when a price of an article is changed, this can be communicated electronically to the tag, enabling the tag to display the new price without the need for manual intervention. A further benefit of electronic labelling systems is the ability to make price changes quickly, even during shopping hours, in accordance with a changing shopper profile. Finally, full integrity is at all times assured between the price being shown on the shelves, the price stored in the central computer, and the price charged at a checkout.

A critical parameter for conventional tags powered by battery current—as known, for example, from the specification of German Patent 37 31 852 A1—is power consumption which should be minimized to reduce battery size and cost and to maximize useful life. Such types of tag are in a position to operate in at least two different modes: The Display mode in which the stored data is represented on a display, and the Receive mode in which, in addition, a receiver is switched on ready to receive data transmitted from the central computer by means of a transceiver.

In conventional electronic labelling systems, each tag spends a small percentage of its time in Receive mode listening for data transmissions from the central computer. If the central computer wishes to transmit data to a single tag, it must first usually transmit a preamble to ensure that all tags (and thus the tag to be updated) are in Receive mode. When a tag enters Receive mode and receives a preamble, it will remain in this mode either until it receives data addressed to it or until it can establish from the data that the transmitted data is destined for a different tag.

In known electronic labelling systems, each tag is in Receive mode for around 1% to 5% of the time. The on period of the receiver, referred to as $T_{on}$ in the following, is determined by the period the receiver needs to establish whether or not the transceiver is transmitting preamble. By contrast, the period spent in the Display mode, and referred to as $T_{off}$ in the following, is determined by the speed with which a store can update all its tags. Each time that a tag requires updating, it is generally necessary for the central computer to transmit a preamble that is at least as long as the period $T_{on}+T_{off}$ in order to ensure that all tags are in Receive mode before actual address and data can be transmitted.

Furthermore, in conventional labelling systems, the computer updates the tags in succession, one after another, allowing each tag to respond with a message confirming that it has correctly received the data sent to it. In a known system it may therefore be said that, once the central computer has been transmitting a preamble for a period $T_{on}+T_{off}$ (to ensure that all tags are in Receive mode), it will need to continue transmitting for a further period $T_c$ to communicate the address of the tag which it wishes to update. Only after this period has elapsed can all other tags that are not being addressed exit the Receive mode. The tags being addressed remain in the Receive mode for a period $T_d$ to permit correct data reception. When tags are not being updated, they remain in Receive mode for the period $T_{on}$ in each period $T_{on}+T_{off}$. Finally, a period $T_r$ may be defined as the time taken for a tag to respond back to the transceiver and thus to the computer to confirm that it has correctly received the data sent to it. A conventional electronic labelling system with N tags will take a total period $N(T_{on}+T_{off}+T_d+T_r)$ to update all N tags.

In known systems, it is a disadvantage that the tags have a relatively high power consumption, particularly in the Receive mode this usually being a multiple of the power required in the Display mode, resulting in the need to provide expensive and large-size batteries with a correspondingly high capacity to achieve sufficient operating periods.

OBJECT OF THE INVENTION

Accordingly, it is an object of the present invention to minimize the power requirements of the tags.

SUMMARY OF THE INVENTION

According to the present invention, the above object is accomplished, in accordance with at least one preferred embodiment, in that the tags comprise devices for synchronizing the receivers, said devices activating the receivers at the same instant in time when a communications frame is being transmitted from the transceiver.

The basic idea is to synchronize the receivers of the tags, by means of suitable devices, in such fashion that they all enter the Receive mode at the same time which coincides with the instant when the transceiver starts transmitting a preamble of a communications frame. Therefore, the transceiver needs only the period $T_{on}$ to transmit the preamble rather than the period $T_{on}+T_{off}$ because all tags enter the Receive mode synchronously, that is, at the same time, which ensures that they receive the data sent to them. Whilst in known systems non-addressed tags need to be in the Receive mode for an average period $0.5(T_{on}+T_{off})+T_c$, the system of the present invention, in accordance with at least one preferred embodiment, requires only the period $T_{on}+T_c$. For the updated tags to be in the Receive mode, only the period $T_{on}+T_d$ is needed, rather than the average period $0.5(T_{on}+T_{off})+T_d$ required by conventional systems.

The advantage of the present invention, in accordance with at least one preferred embodiment resides primarily in that the power requirement of the tags is substantially reduced because of the significantly reduced on-periods of the receiver, without adversely affecting the updating periods. The period of operation of the tags is reduced where like batteries are used; alternatively, batteries of reduced size and cost may be used while the useful life is maintained unchanged.

To synchronize the tags, it is appropriate to use an integrated internal clock which activates the receiver for a predetermined period $T_{on}+T_c$ (unless it receives data addressed to the tag) or $T_{on}+T_d$, deactivating it for period $T_{off}$. Such a clock may be implemented with a quartz oscillator and commercially available circuitry.

If the tags were synchronized by means of an internal clock exclusively, this would exhibit the disadvantage that the clocks of all tags would have to be reset in a complex procedure, for example, when installing the system. In addition, a synchronized condition can only last for a certain period because of unavoidable tolerances of the frequency-determining elements (quartz oscillator). Therefore, it proves suitable to update the internal clocks of the tags regularly by means of the transceiver which then transmits synchronization signals. These signals may be contained in, precede, or follow the communications frames. For example, the preamble of a communications frame may serve as synchronization signal.

Tags may lose their synchronized condition in the event of transceiver breakdown or radio interference. Whilst it is conceivable to operate the receivers of unsynchronized tags continuously, enabling them to be updated very quickly, the power consumption would be unnecessarily high, particularly in the event of a defective transceiver or continuous interference. It is therefore suggested to activate the receiver of an unsynchronized tag periodically until it receives a signal suitable for updating the internal clock, that is, a synchronization signal. To prevent the receiver from being only active when the transceiver is off (that is, for the period $T_{off}$), the period is suitably selected so it differs from the time elapsing between two synchronization signals. In this manner, the reception of a synchronization signal is ensured at least after a certain interval. It will be understood that the present invention is not limited to any particular strategy for entering or re-entering synchronization, that is, the selection of the period and the on-time of the unsynchronized receiver as well as of the time elapsing between two synchronization signals, although a quick synchronization with a minimum turn-on time is preferred. Further, it may also be envisaged to shorten the period between two consecutive synchronization signals from the transceiver if it receives a corresponding feedback from an unsynchronized tag.

Furthermore, it is suggested to update multiple tags in the same communications frame so as to further reduce the time that the tags, on average, need to be in the Receive mode. Data for different tags can thus be transmitted in direct succession without the central computer waiting for each tag to respond. In conventional systems with N tags being updated in series, one after another, each tag is in Receive mode for, on average, a period $0.5N(T_{on}+T_{off})+(N-1)T_c+T_d$, whereas in this embodiment of the invention, the receiver is required to be turned on for a substantially reduced period $T_{on}+T_d$ only. Period $T_d$ must preferably be chosen to be sufficiently long so as to be able to accommodate a correspondingly large number of data in the communications frame. To reduce power consumption, it will be an advantage to provide the tags with devices which turn the receivers off after they have received preamble of a communications frame, turning them on again when data addressed to them is being transmitted from the transceiver, so that the receivers are active for a minimum period only.

Advantageously, feedback signals from tags, confirming that they have received correct data, are sent to the computer at the end of a communications frame, that is, after transmission of data is complete, normally by means of electromagnetic waves, each tag being allocated a unique, predetermined window in time in which to respond. Because the central computer needs the feedback signals to establish whether the prices displayed are in conformity with the prices stored in its memory, each updated tag is required to send a confirmation signal within its allocated time slot, using equally electromagnetic (infrared or radio) waves for this purpose. The computer can readily recognize, by the time the confirmation signal is received, which tag has responded and which tag has experienced transmission problems. In the latter case, the relevant data is again transmitted in the next sequential communications frame.

In a preferred embodiment of the present invention, the tags are divided into logical groups. All receivers within a group are thus synchronized to enter the Receive mode at the same instant, different groups turning on at different times. Considering that each group enters the Receive mode substantially less frequently, namely only at the instants allocated to it, a further reduction in the mean power consumption results. In a system with N tags divided into M groups having P tags each, each tag is in the Receive mode for, on average, $T_{on}+T_d$ until all tags are updated. This is a significant reduction from $0.5N(T_{on}+T_{off})+(N-1)T_c+T_d$ of conventional systems (which, as a rule, may be equated with $0.5NT_{off}$, because $T_{off}$ is substantially greater than $T_{on}$, $T_c$, and $T_d$.

The division of tags into groups can also be independent of the tags' position in the store and/or of the type of article for which they indicate a price mark.

When combining this embodiment with an arrangment wherein:

the computer transmits data for different tags in direct succession; and each tag is allocated a unique time window occurring subsequent to the transmission of data from the computer to the tags, in which time window the tag emits electromagnetic waves to the computer to confirm that it has received the data addressed to it;

the time taken to update a complete system of N tags is reduced from $N(T_{on}+T_{off}+T_c+T_d)$ in a conventional system to $MT_{on}+N(T_d+T_r)$ if all P tags are addressed in a data frame. This is an important result, as it means that the period $T_{off}$ is essentially no longer of relevance. This allows $T_{off}$ to be increased with a proportional reduction in the ration $T_{on}/(T_{on}+T_{off})$ which determines the power consumption of tags when not being updated.

In addition, the period in which a complete system (and, as indicated in the foregoing, also a single tag) is updated is reduced, allowing the off period $T_{off}$ to be increased by a factor of $[MT_{on}+N(T_d+T_r)]/(NT_{off})$ while the update speeds remain the same. When no tag is being updated, the power consumption of the receiver is reduced by about the same factor, dropping by a factor of $(T_{on}+T_d)/(0.5NT_{off})$, approximately, when all tags are being updated. In practice, these measures have the combined effect of reducing the power consumption of the receiver part of a tag by several orders of magnitude, such that it becomes insignificant as a part of the total operating current, irrespective of update frequency.

While price data is typically communicated in binary coded or binary coded decimal format from the computer to the tags, using as a rule a seven-segment display pattern, it is further recommended to communicate such data in a format in which one binary information item corresponds to one segment of the tag display elements. Thus, the central computer converts the numerical data to a seven-bit pattern corresponding to a seven-segment display, communicating it to the transceiver. The advantage resides in the extended display capabilities using conventional seven-segment displays: For example, the central computer may address the segments through the digits 0 to 9 such that non-numeric patterns or characters are represented. In a further embodiment, one or more starburst-segment displays involving 14 segments can be utilized which, in addition to horizontally and vertically extending segments, include also diagonal segments. They may be used for the display of numeric digits as well as alphabetic characters. In yet another embodiment, dot-matrix displays may be used for displaying alphabetic characters, numeric digits, and any other non-alphanumeric symbols. Finally, customized symbols may be used, each addressed as one segment by means of a single bit.

In view of their low power requirements, liquid crystal displays (LCDs) are primarily utilized as display elements.

To supply the tags with power, accumulators and/or solar cells may be used as an alternative to batteries.

Finally, radio or infrared waves are proposed as a means of data communication.

The above discussed embodiments of the present invention will be described further hereinbelow with reference to the accompanying figures. When the word "invention" is used in this specification, the word "invention" includes "inventions", that is, the plural of "invention". By stating "invention", the Applicant(s) does/do not in any way admit that the present application does not include more than one patentably and non-obviously distinct invention, and maintains that this application may include more than one patentably and non-obviously distinct invention. The Applicant(s) hereby assert(s) that the disclosure of this application may include more than one invention, and, in the event that there is more than one invention, that these inventions may be patentable and non-obvious one with respect to the other.

One aspect of the invention resides broadly in an information display system for displaying information, such as, pricing information on shelves containing merchandise, said system comprising: information display means, said information display means comprising units for being affixed, such as, to store shelves; said information display means comprising means for receiving initial information and for updating information displayed by said information display means; said information display means comprising receiving means for receiving information from a source of information disposed distant from said information display means; said receiving means comprising memory means for storing information to be displayed on said information display means; said information display means being connected to said receiver means; said information display means being connected for receiving information stored in said memory means; transmitter means for transmitting information to be received by said receiver means; said transmitter means and said receiver means comprising means for synchronizing said receiver means; said synchronization means comprising receiver synchronization means and transmitter synchronization means; said receiver synchronization means comprising means for activating said receiver means at the same time as said transmitter synchronization means energizes said transmitter means to send a signal to said receiver means.

Another aspect of the invention resides broadly in a method of operating an information display system for displaying information, such as, pricing information on shelves containing merchandise, said system comprising: information display means, said information display means comprising units for being affixed, such as, to store shelves; said information display means comprising means for receiving initial information and for updating information displayed by said information display means; said information display means comprising receiving means for receiving information from a source of information disposed distant from said information display means; said receiving means comprising memory means for storing information to be displayed on said information display means; said information display means being connected to said receiver means; said information display means being connected for receiving information stored in said memory means; transmitter means for transmitting information to be received by said receiver means; said transmitter means and said receiver means comprising means for synchronizing said receiver means; said synchronization means comprising receiver synchronization means and transmitter synchronization means; said receiver synchronization means comprising means for activating said receiver means at the same time as said transmitter synchronization means energizes said transmitter means to send a signal to said receiver means; said method comprising the steps of: providing information display means, said providing information display means comprising providing units for being affixed, such as, to store shelves; providing said information display means comprising providing means for receiving initial information and for updating information displayed by said information display means; providing said information display means comprising providing receiving means for receiving information from a source of information disposed distant from said information display means; providing said receiving means comprising providing memory means for storing information to be displayed on said information display means; providing said information display means being provided to connect to said receiver means; providing said information display means being provided to connect to receive information stored in said memory means; providing transmitter means provided for transmitting information to be received by said receiver means; providing said transmitter means and said receiver means comprising providing means for synchronizing said receiver means; providing said synchronization means comprising providing receiver synchronization means and transmitter synchronization means; providing said receiver synchronization means comprising providing means for activating said receiver means at the same time as said transmitter synchronization means energizes said transmitter means to send a signal to said receiver means; said method further comprising the steps of: providing information to said information display means; receiving information on said means for receiving initial information and for updating information displayed by said information display means; receiving information from a source of information disposed distant from said information display means with said receiving means; storing information in said memory means for storing information to be displayed on said information display means; transmitting information to be received by said receiver means; activating said receiver means at the same time as said transmitter synchronization means energizes said transmitter means to send a signal to said receiver means.

BRIEF DESCRIPTION OF THE DRAWINGS

Embodiments of the present invention will now be described in more detail in the following with reference to the accompanying drawings showing schematically in FIG. 1 is a block diagram of an electronic labelling system;

FIG. 14 illustrates groups of tags.

DESCRIPTION OF THE PREFERRED EMBODIMENT

Figure 1:
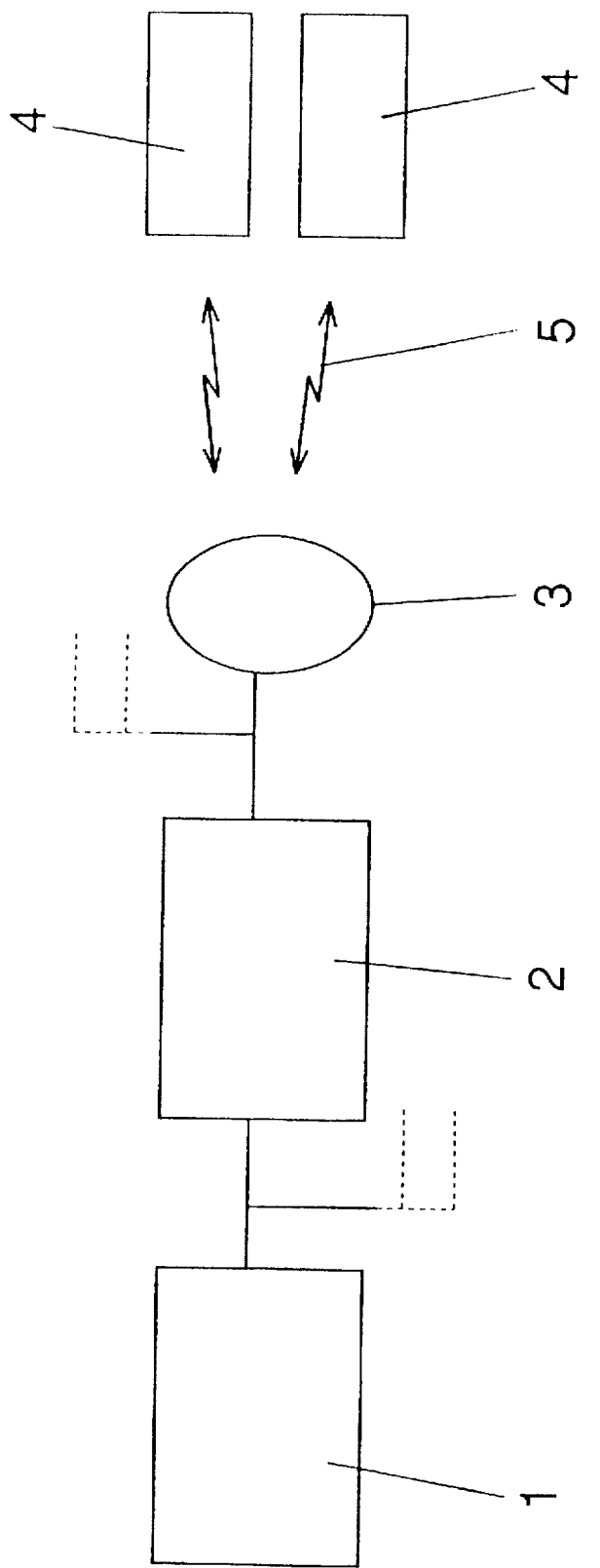
FIG. 1a is a block diagram of an electronic labelling system.

Referring now to FIG. 1 of the drawings, there is shown an electronic labelling system comprising a central computer 1 containing a file holding the price and the number of each article (referred to as "stock-keeping unit" in British usage). The central computer 1 communicates with one or more transceivers 2, each of which is connected to one or more radio-frequency antennas 3. The antennas 3 are positioned to allow communications with all tags 4 in the store by radio waves 5. The tags 4, which may be fixed to the edge of shelves, receive updated price information from the transceiver 2, responding back with acknowledgement signals.

Figure 1A:
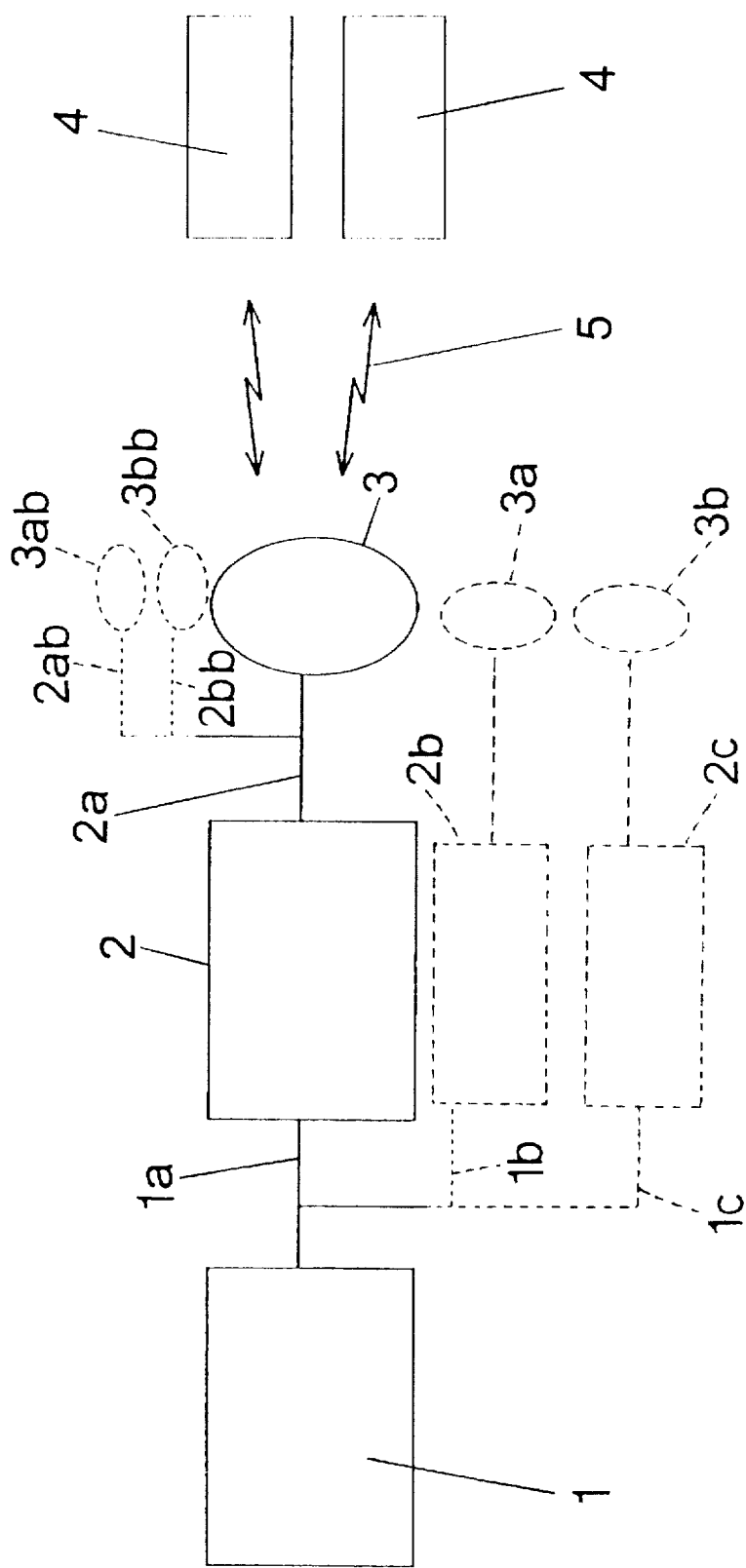

FIG. 1a shows an electronic labelling system comprising a central computer 1 containing a file holding the price and the number of each article (referred to as "stock-keeping unit"). The central computer 1 communicates with one or more of the transceivers 2, 2b, or 2c via a path 1a, 1b, or 1c. The transceivers 2, 2b, or 2c are connected to one or more radio-frequecncy antennas 3, 3a, 3b, 3ab, or 3bb. The communication travels to the antennas 3, 3a, 3b, 3ab, or 3bb via one or more of the paths 2a, 2ab, or 2bb. It should be noted that these quantities of transceivers 2, 2b, and 2c, as well as the various communication paths 1a, 1b, 1c, 2a, 2ab, and 2bb, in addition to the antennas 3ab, 3bb, 3, 3a, and 3b are for illustrative purposes only, and any amount and combination of these elements is possible.

Figure 2:
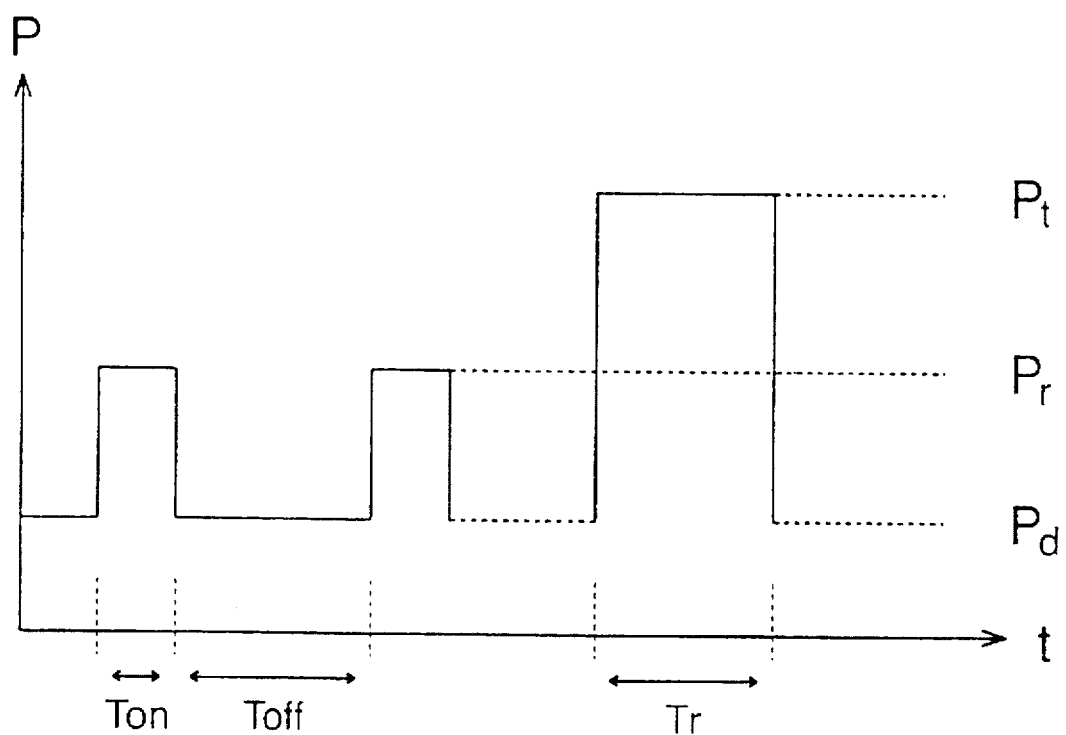
FIG. 2 is a graphical representation of the power requirements of a tag.

FIG. 2 shows the power consumption of the tags 4 plotted against time, on a logarithmic scale. When not actively receiving data, the tag 4 is consuming a minimum amount of power necessary to operate the liquid crystal displays. This power is referred to as $P_d$. For a period $T_{on}$ in every period $T_{on}+T_{off}$, the tag receiver is turned on, to detect whether the transceiver is transmitting a preamble. This operating mode is referred to as the Receive mode, and the power consumption is designated $P_r$. Typically, $P_r$ is much greater than $P_d$, and therefore it is preferable that $T_{off}$ be substantially greater than $T_{on}$ to minimize average power consumption. When the tag 4 correctly receives updated data from the central computer 1, it transmits a response to acknowledge reception. This operating mode is referred to as Transmit mode, with a power consumption $P_t$. Typically, $P_t$ is substantially greater than $P_r$ and $P_d$, and for this reason the transmit time $T_t$ should be kept to a minimum.

Figure 3:
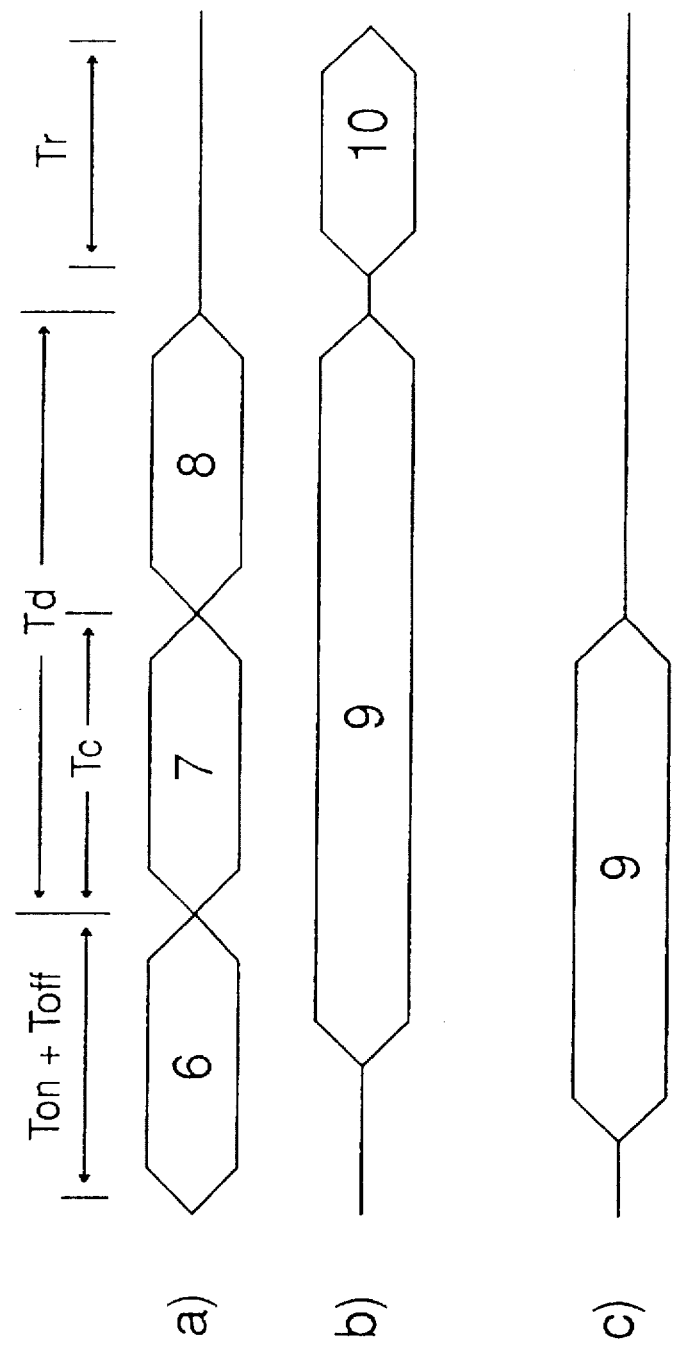
FIG. 3 is data communication in a state of the art system.

FIG. 3 shows communication between the transceiver 2 (reference character (a)) and two tags 4 (reference characters (b) and (c)) of a conventional system. The transceiver 2 first transmits a preamble 6, followed by an address 7 and the new data 8 to be displayed. At an instant in time following the start of preamble 6, tag b enters the Receive mode 9, establishing from the preamble 6 received that it is required to remain in the Receive mode 9. After period $T_c$ has elapsed, the tag has detected that the address 7 is its own. After period $T_d$ has elapsed, all data 8 is transmitted to the tag b, the tag then entering the Transmit mode 10 to confirm that it has correctly received its data. As regards tag c, it remains in the Receive mode 9 because of the preamble 6 received, exiting it however as soon as it becomes apparent from the address 7 that the data 8 is destined for a different tag. Because the tags b and c are not synchronized, it is necessary for the transceiver 2 to transmit preamble 6 at least for a period $T_{on}+T_{off}$ to ensure that all tags 4 are in the Receive mode 9 when the transceiver starts transmitting the tag addresses. From FIG. 3 it can be seen that the average time an updated tag 4 spends in the Receive mode is $0.5(T_{on}+T_{off})+T_d$. By contrast, a tag 4 not being addressed needs $0.5(T_{on}+T_{off})+T_c$ to determine that the transmission is for another tag.

Figure 4:
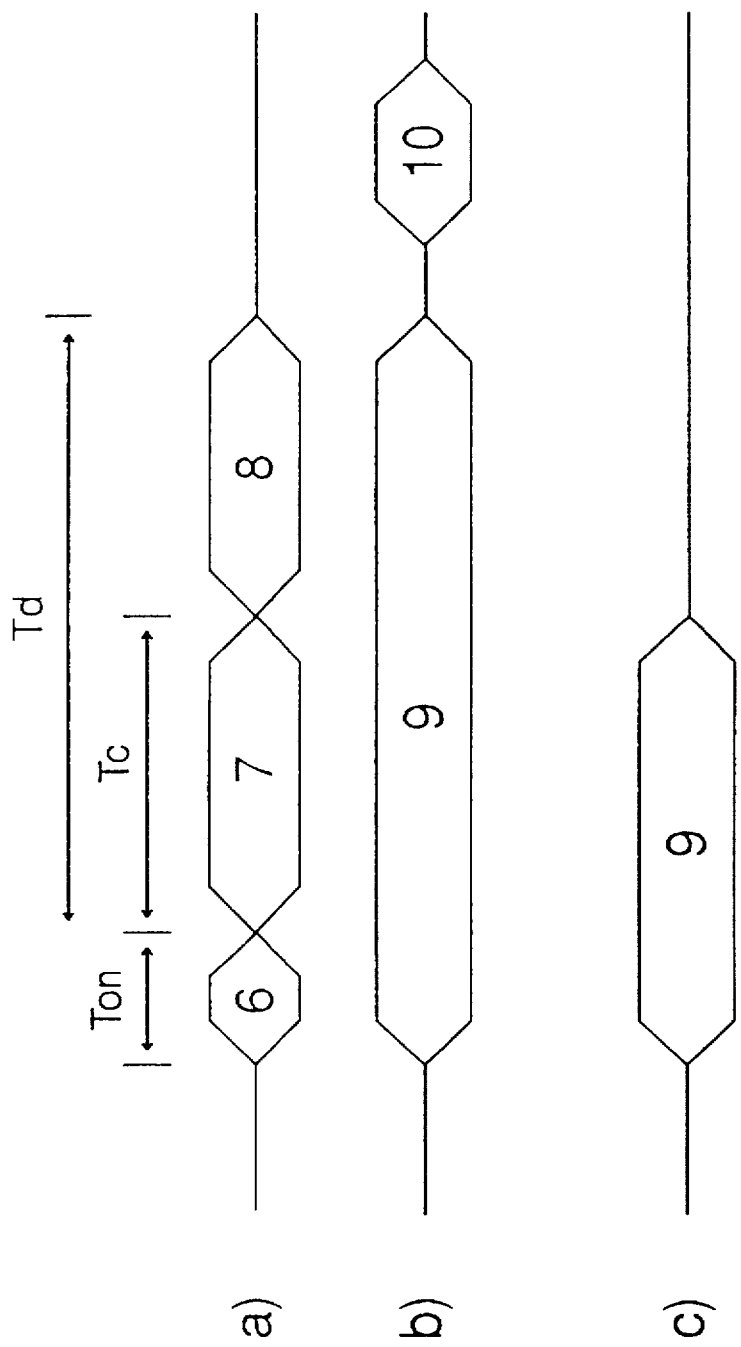
FIG. 4 is data communication in a system according to this invention.

FIG. 4 shows communication between the transceiver (reference character a) and two tags (reference characters b and c). Tag b detects from the address 7 that it is to receive data 8, remaining in the Receive mode 9 and finally transmitting a confirmation 10 to the transceiver a. Tag c, recognizing that the address 7 is not its own, exits the Receive mode 9 at a substantially earlier instant in time. As the tags b and c are synchronized, it is only necessary for the transceiver a to transmit preamble 6 for a period $T_{on}$ to ensure that all tags are in the Receive mode 9. It may also be contemplated to omit the preamble 6 entirely. It is apparent that the average time which the updated tag b spends in the Receive mode 9 is $T_{on}+T_d$, while the tag c not being addressed remains in this mode for $T_{on}+T_c$.

Figure 5:
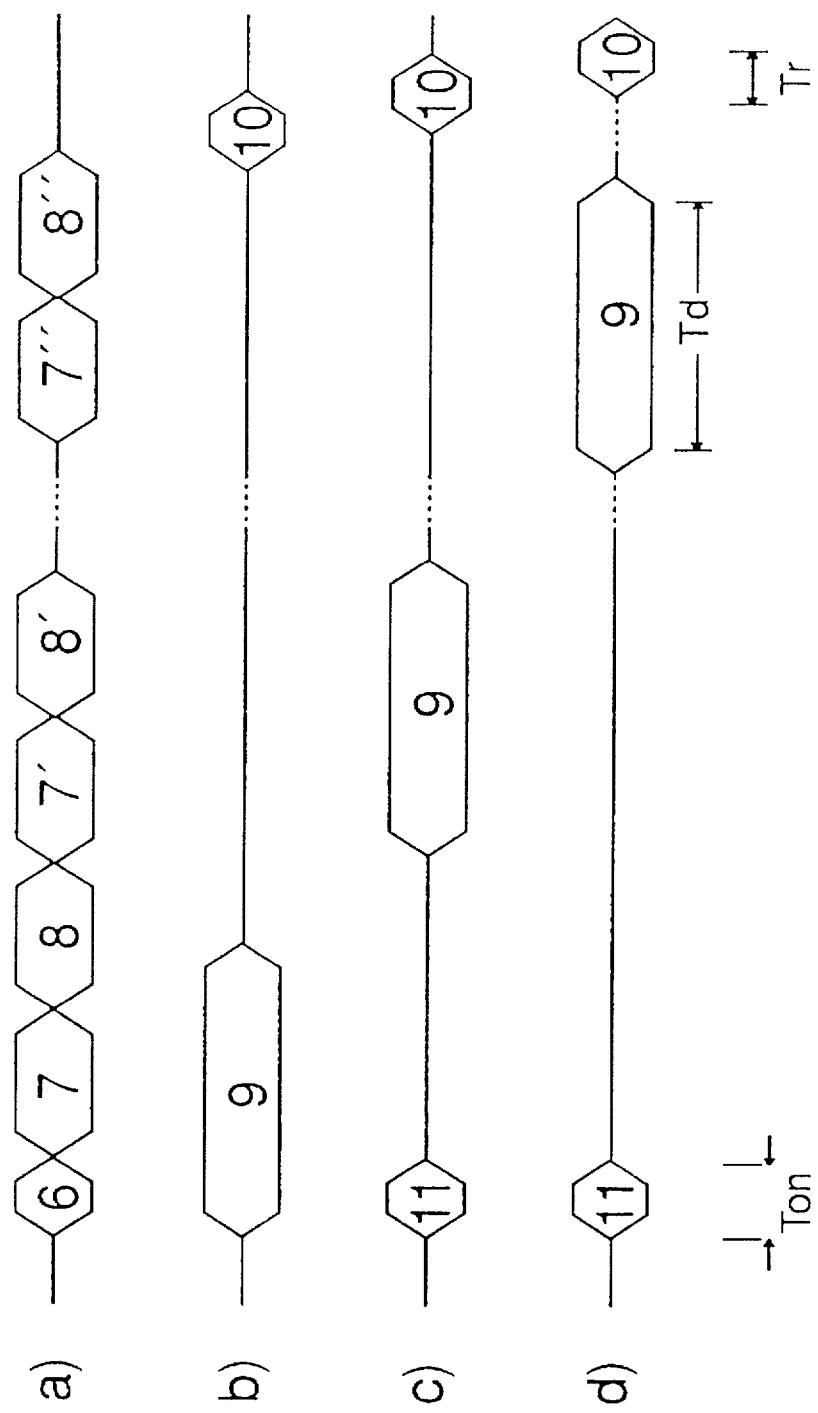
FIG. 5 is data communication in a system according to this invention in which feedback signals are issued subsequent to a data frame.

FIG. 5 shows communication between the transceiver a and three tags b, c, and d. The tags are addressed in direct succession, subsequently transmitting feedback signals 10 within their allocated time windows. As in FIG. 4, all tags are synchronized and, therefore, preamble 6 is transmitted for only period $T_{on}$ to ensure that all tags are (re) synchronized. The tags are "time division multiplexed", whereby each tag has a unique time window in which to receive address and data. Once each tag has received as indicated at (11) preamble 6, it then only turns on its receiver for the appropriate time window, according to its tag number. Accordingly, first only tag b remains in the Receive mode 9, receiving its allocated address 7 and data 8. Then tag c enters the Receive mode 9 and receives its address 7' and data 8'. Finally, also tag d enters the Receive mode 9, receiving its address 7" and data 8". In this system, each tag transmits its confirmation signal 10 in a designated time window so the central computer 1 can identify each response transmission according to the time slot in which it is received.

Figure 6:
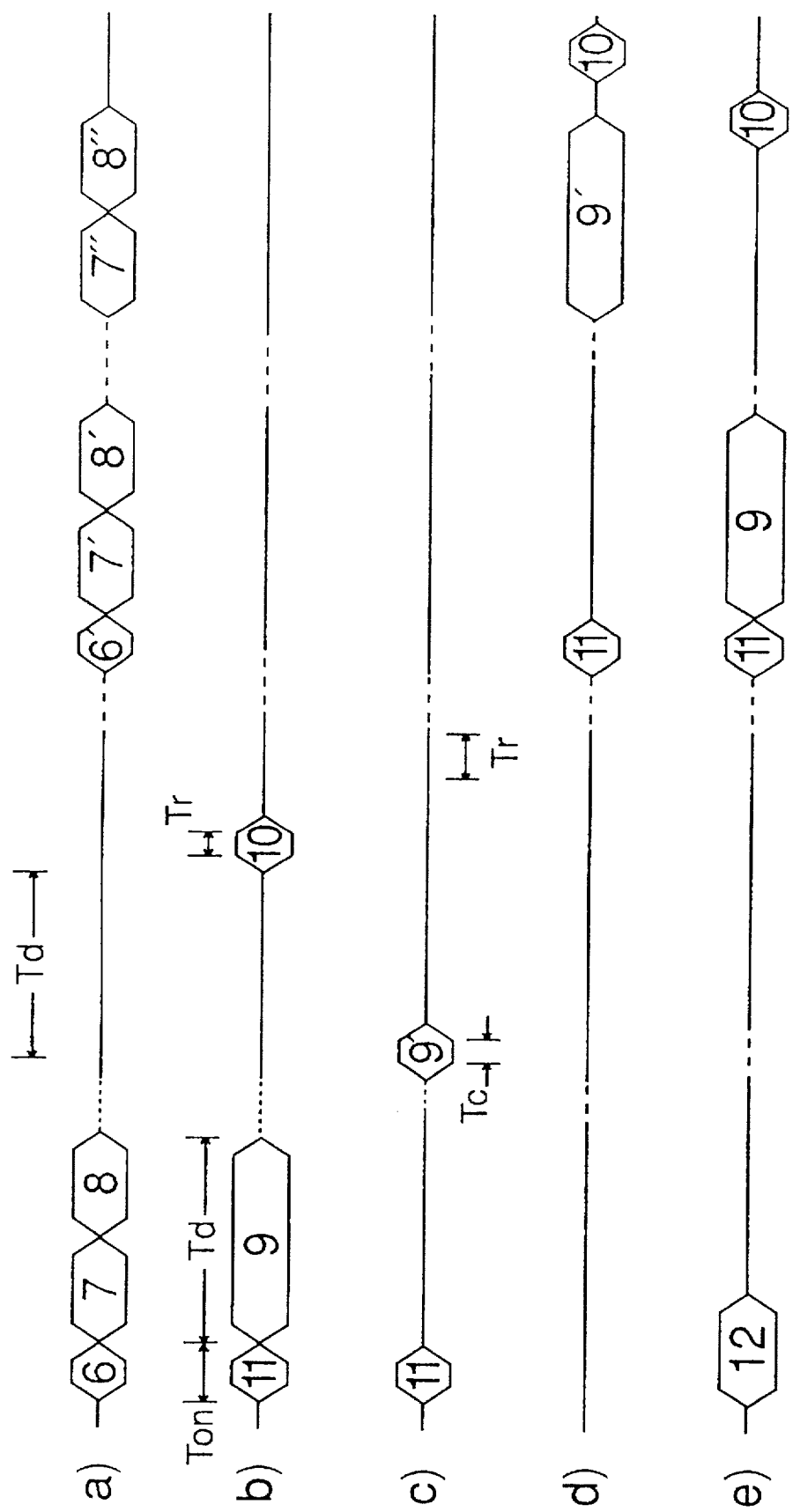
FIG. 6 is data communication in a system of this invention divided into groups.

FIG. 6 shows communication between the transceiver a and four tags divided into two groups each of two tags [(b, c) and (d, e), respectively.] When preamble 6 is transmitted, the tags b and c of the first group enter the Receive mode 9 and 9' successively, a confirmation signal 10 being then transmitted only by the updated tag b which has received address 7 and data 8. Tag c remains in the Receive mode 9' only for period $T_{on}-T_c$, transmitting no response in its allocated time window to save power. Subsequently, tags d and e of the second group enter the Receive mode 9 and 9' concurrently with the reception 11 of a second preamble 6', receiving their allocated addresses 7' and 7" and data 8' and 8", and finally transmitting confirmations 10 in their designated time windows. Tag e, which is initially unsynchronized, starts with the Synchronize mode 12 in which it updates its internal clock by means of the first preamble 6 associated with the other group. Tag d, however, is synchronized, starting receiving 11 for the first time synchronously with the preamble 6' allocated to its group.

Figure 7:
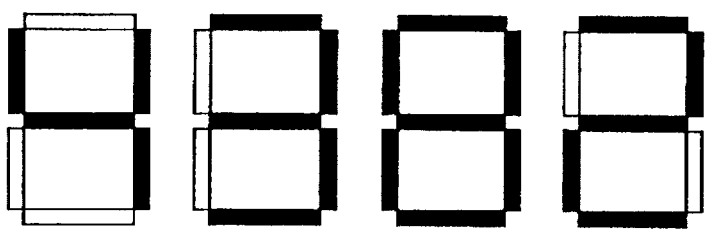
FIGS. 7 to 11 illustrate various display elements.
Figure 8:
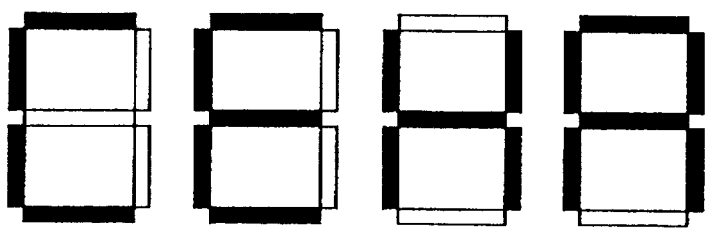
Figure 9:
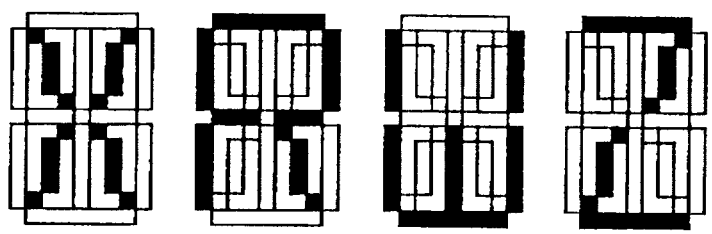
Figure 10:
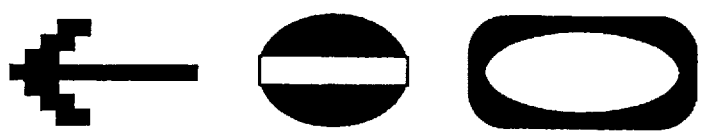
Figure 11:
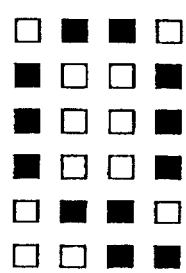

FIGS. 7 to 11 illustrate various display elements suitable for use in tags of the present invention. FIG. 7 illustrates a seven-segment display representing the digits 4 3 8 2. In FIG. 8, the same display is used for representation of the characters C E H A. FIG. 9 shows starburst-segment displays, using also diagonal segments in addition to the horizontal and vertical segments (14 segments in total). The characters shown are X R W Z. FIG. 10 shows customized symbols which can be displayed by means of a single binary information item. Shown from left to right are an arrow, a "Do Not Enter" sign, and an oval in a rectangle. FIG. 11 is a dot matrix display showing the character Q.

Figure 12:
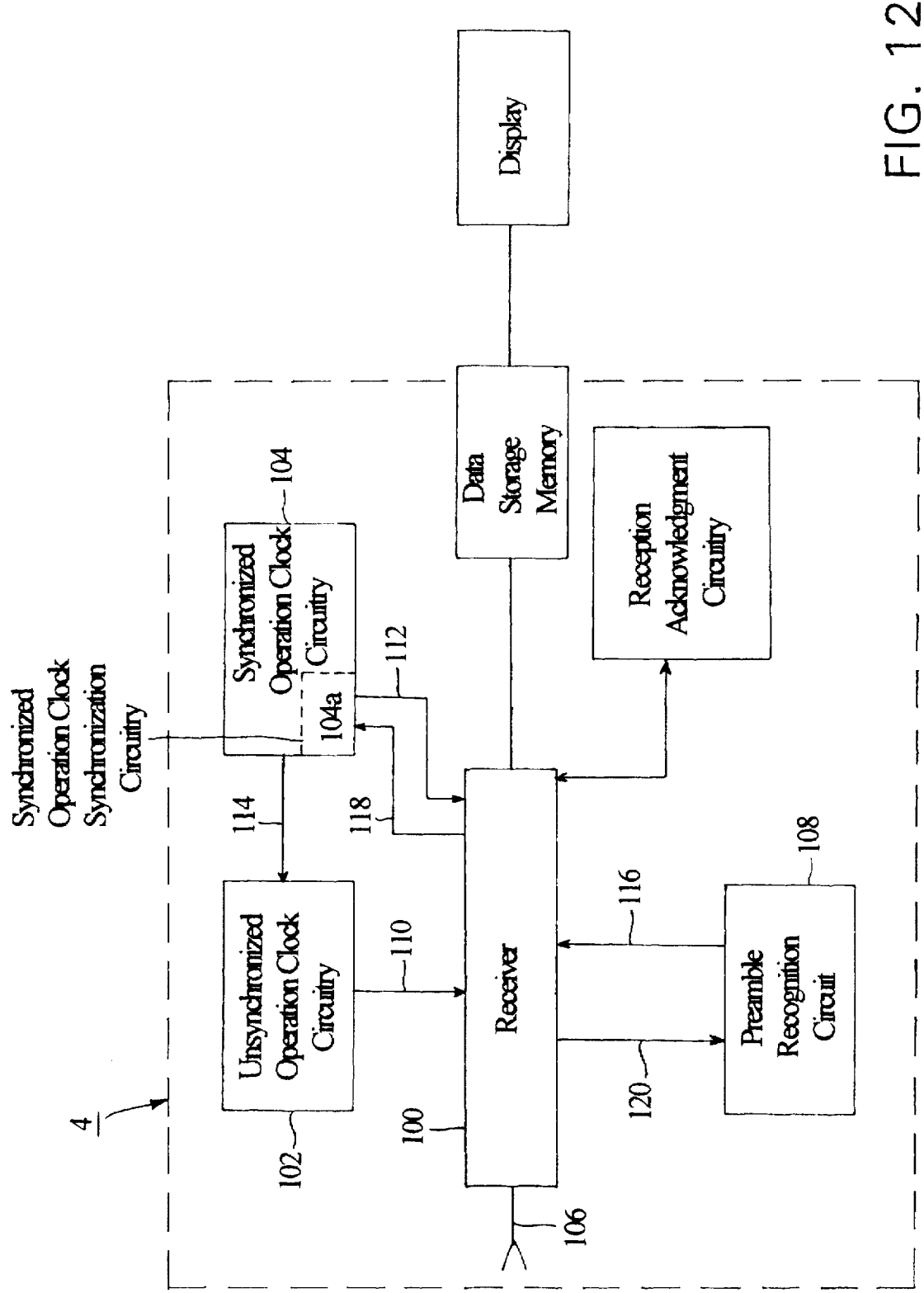
FIG. 12 illustrates various circuitry within a tag.

FIG. 12 illustrates circuitry inside the tag 4. The unsynchronized operation clock circuitry 102 can periodically send a signal, via path 110, to the receiver 100 to turn the receiver 100 on for a predetermined period of time. During the predetermined period of time that the receiver 100 is turned on by the unsynchronized operation clock circuitry 102, the receiver 100 can wait for a synchronization pulse along path 112. Once the receiver 100 receives the synchronization pulse via path 112, the receiver 100 can send a signal via path 118 to the synchronized operation clock circuitry 104, to turn the synchronized operation clock circuitry 104 on. The receiver 100 can also send a signal (along path 118 and to path 114), via the synchronized operation clock circuitry 104, to the unsynchronized operation clock circuitry 102, to turn the unsynchronized operation clock circuitry 102 off. The internal synchronization clock in the synchronized operation clock synchronization circuitry 104a, inside of the the synchronized operation clock circuitry 104, is then preferably reset. Both the synchronized operation clock circuitry 104 and the unsynchronized operation clock circuitry 102 are necessary because it is generally ideal to activate the receiver 100 of an unsynchronized tag 4 periodically until it receives a signal (via path 112) suitable for updating the internal clock, that is, a synchronization signal.

As discussed above in the summary, the receiver 100 of an unsynchronized tag 4 can be activated periodically until the receiver 100 receives a synchronization signal along path 112 to update the internal clock in the synchronized operation clock circuitry 104. The selection of the period for entering synchronization, that is, the selection of the period and the on-time of the unsynchronized receiver 100, as well as of the time elapsing between two synchronization signals, can be determined by the user. However, it should be noted that a quick synchronization with a minimum turn-on time is preferred. This is done to conserve power or energy, as running the receivers 100 of the unsynchronized tags 4 while waiting to receive a signal via path 112 would tend to consume large amounts of power and/or energy. This especially holds true in cases where there is constant interference or a faulty transceiver. Thus, it will not be possible for any signal along path 112 to reach the tag 4. In cases such as this, if there were no unsynchronized operation clock circuitry 102 present, the receiver 100 would run continuously without receiving any synchronization signals via path 112, and the receiver 100 would quickly use all of the available power and/or energy. However, in the present invention, the power requirement of the tags 4 is substantially reduced because of the significantly reduced on-periods of the receiver 100, without adversely affecting the updating periods.

FIG. 12 also illustrates the preamble recognition circuit 108. The preamble recognition circuit 108 is intended to receive the preamble being transmitted to the tag 4. The receiver 100 transmits the data to the preamble recognition circuit 108, via path 120. If the preamble being transmitted is intended for that particular tag 4, the preamble recognition circuit 108 recognizes the preamble as being intended for that tag 4, and the receiver 100 will then remain on to receive the rest of the data intended for that tag 4. However, if the preamble is not the preamble intended for that particular tag 4, the preamble recognition circuit 108 sends a signal to the receiver 100 via path 116, to turn the receiver 100 off. The antenna 106 located on the receiver 100 allows signals from the central computer to be received.

Figure 13:
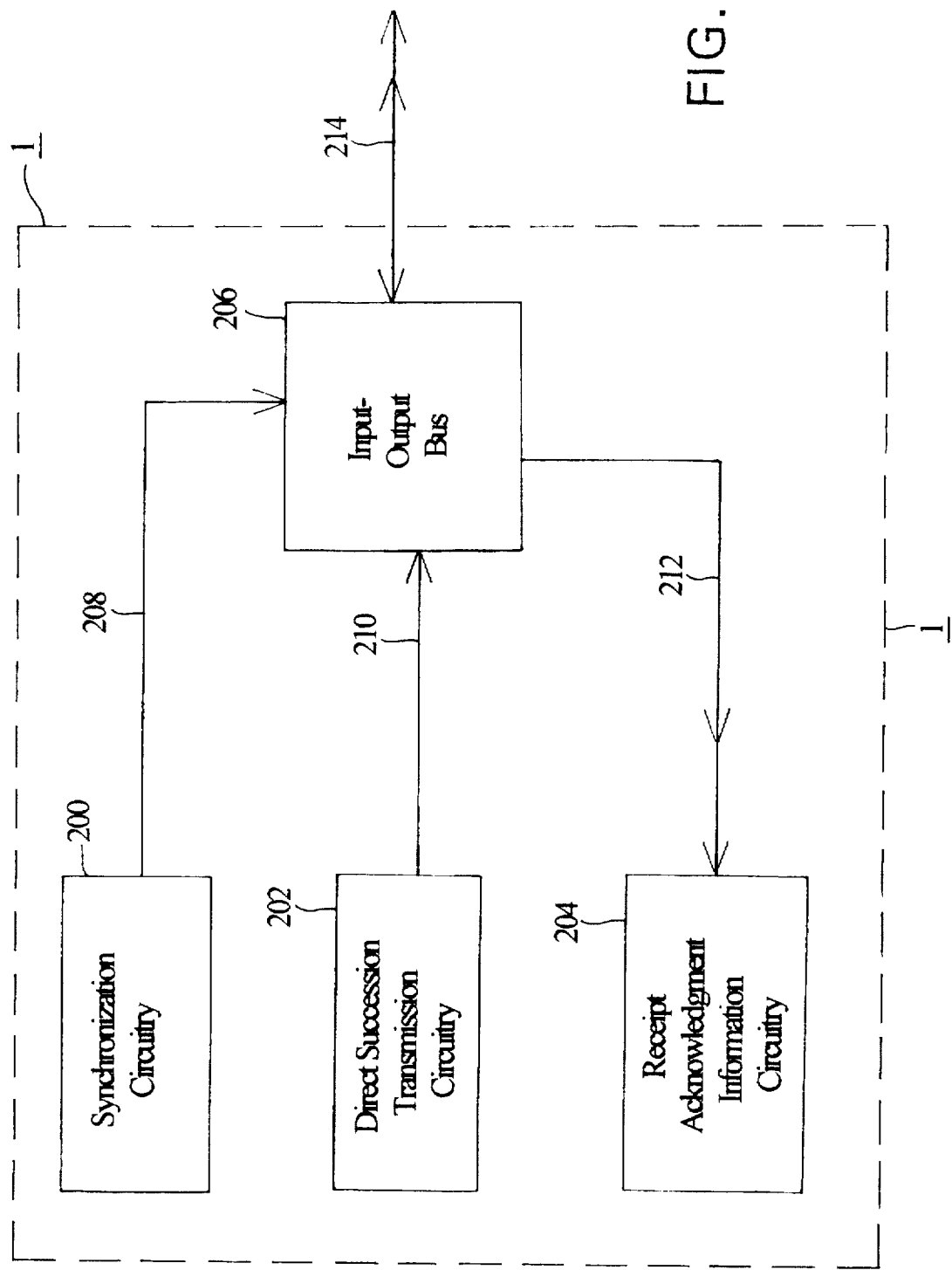
FIG. 13 details the inner circuitry of a central computer.

FIG. 13 details the inner circuitry of the central computer 1, in accordance with at least one preferred embodiment of the present invention. The synchronization circuitry 200 transmits a synchronization signal via path 208 to the input-output bus 206. The synchronization signal is then transmitted from the computer 1 through the input-output bus 206 along path 214. The direct succession transmission circuitry 202 transmits updating data from the computer 1 to the tags 4. The data is transmitted from the direct succession transmission circuitry 202 along path 210 to the input-output bus 206. The input-output bus 206 then transmits the information from the computer 1 to the tags 4 via path 214. The direct succession transmission circuitry 202 can transmit data packets to the tags 4 one immediately after the other. The reception acknowledgement information circuitry 204 receives the confirmation of data received signal transmitted by the tags 4. Once a tag 4 has received data intended for that tag 4, the tag transmits a signal back to the computer 1. This signal sent by the tag 4 confirming receipt of the data that was transmitted by the computer 1, travels into the input-output bus 206 along path 214, and then onto the reception acknowledgement information circuitry 204 via path 212.

FIG. 14 illustrates two groups of tags 4AA and 4BB, substantially as discussed hereinabove, for example with relation to FIG. 5. It should be noted that numerous tags are possible, and this is only one representation of what is possible. The tags 4a, 4b, 4c, 4x, 4y, and 4z are illustrated in FIG. 14 receiving radio waves 5a, 5b, 5c, 5x, 5y, and 5z.

It will be appreciated that as a result, a labelling system is obtained featuring low power requirements and a wide variety of possibilities in tag use.

Examples of circuit boards, which may be utilized in accordance with the embodiments of the present invention, may be found in the following U.S. Pat. Nos. 5,303,466, which issued to Ozai et al. on Apr. 19, 1994; No. 5,304,252, which issued to Condra et al. on Apr. 19, 1994; and No. 5,304,428, which issued to Takami on Apr. 19, 1994.

Examples of microprocessors having addressing capabilities, which may be utilized in accordance with the embodiments of the present invention, may be found in the following U.S. Pat. Nos. 4,541,045, which issued to Kromer on Sep. 10, 1985; No. 4,419,727, which issued to Holtey et al. on Dec. 6, 1983; No. 4,307,448, which issued to Sattler on Dec. 22, 1981; and No. 4,202,035, which issued to Lane on May 6, 1980.

Examples of non-volatile memory arrangements, which may be utilized in accordance with the embodiments of the present invention, may be found in the following U.S. Pat. Nos. 5,301,161, which issued to Landgraf et al. on Apr. 5, 1994; No. 5,292,681, which issued to Lee et al. on Mar. 8, 1994; and No. 5,293,062, which issued to Nakao on Mar. 8, 1994.

Examples of other components, such as transmission arrangements, wiring arrangements, and computer arrangements, which may conceivably be utilized in accordance with the embodiments of the present invention, may be found in the following U.S. Pat. Nos. 4,888,709, which issued to Revesz; No. 4,821,921, which issued to Stevens et al. on Apr. 11, 1989; No. 4,521,677, which issued to Sarwin in June 1985; No. 4,500,880, which issued to Gomersall et al. in February 1985; No. 4,339,772, which issued to Eilers et al. in January 1982; and No. 4,028,537, which issued to Snow in June 1977.

Data transmission systems which may be utilized in accordance with the present invention are disclosed in the following U.S. Pat. Nos. 5,345,231 to Koo et al. on Sep. 6, 1994, entitled "Contactless Inductive Data Transmission System"; No. 4,962,466 to Revesz et al. on Oct. 9, 1990, entitled "Electronic Product Information Display"; No. 5,172,314 to Poland et al. on Dec. 15, 1992, entitled "Apparatus for Communicating Price Changes Including Printer and Display Devices"; No. 4,500,880 to Gomersall et al. on Feb. 19, 1985, entitled "Real Time Computer Driven Retail Pricing Display System"; No. 4,821,291 to Stevens et al. on Apr. 11, 1989, entitled "Improvements In or Relating to Signal Communication Systems"; No. 5,253,345 to Fernandos et al. on Oct. 12, 1993, entitled "Point of Sale Register System"; and No. 5,247,380 to Lee et al. on Sep. 21, 1993, entitled "Infrared Communications Network".

Additional circuit boards which may be utilized in conjunction with the present invention may be disclosed in the following U.S. Pat. Nos. 5,194,313 to Hupe et al. on Mar. 16, 1993, entitled "Through-hole Plated Printed Circuit Board and Process for Manufacturing Same"; and No. 5,196,712 to Nguyen et al. on Mar. 23, 1993, entitled "Printed Circuit Board Apparatus With Optical Switching".

Antennas which may be utilized in conjunction with the present invention may be disclosed in the following U.S. Pat. Nos. 5,227,805 to King et al. on Jul. 13, 1993, entitled "Antenna Loop/Battery Spring"; No. 5,374,906 to Noguchi, Kiyosue, and Yonsda on Dec. 20, 1994, entitled "Filter Device for Transmitter-Receiver Antenna"; and No. 5,281,941 to Bernstein on Jan. 25, 1994, entitled "Coil Form and Coil for Antenna Coils, or the Like".

Liquid crystal displays which may be utilized in conjunction with the present invention may be disclosed in the following U.S. Patents: No. 5,177,629 to Bohannon on Jan. 5, 1993, entitled "Liquid Crystal Display With an Optical Fluid Layer"; and No. 5,179,457 to Hirataka et al. on Jan. 12, 1993, entitled "Liquid Crystal Display Device With Birefringent Film Between the Substrates of the Liquid Crystal".

Examples of interrogation circuits which could possibly be utilized in one embodiment of the present invention may include the following U.S. Pat. No. 5,216,287 to Tigges and Sowa on Jun. 1, 1993, entitled "Electronic, Preferably Zero-Contact Switch"; and No. 5,335,120 to Colineau and Valet on Aug. 2, 1994, entitled "Device for Reading a Set of Resistive Elements Featuring Interrogation and Voltage Stabilization Circuits".

Power or battery saving or conserving receivers which may be utilized in conjunction with the present invention may be disclosed in the following U.S. Pat. Nos. 5,204,986 to Ito et al. on Apr. 20, 1993, entitled "Battery Power Radio Devices Having a Battery Saving Function"; No. 5,239,306 to Siwiak et al. on Aug. 24, 1993, entitled "Dual Mode Receiver Having Battery Saving Capability"; No. 5,296,849 to Ide on Mar. 22, 1994, entitled "Pager Receiver for Enabling to Omit Power-On Signal for Receiving Synchronization Code in Pager Signal"; No. 5,355,518 to Kindinger et al. on Oct. 11, 1994, entitled "Receiver with Constant Battery Saving Duty Cycle"; No. 5,359,594 to Gould et al. on Oct. 25, 1994, entitled "Power-Saving Full Duplex Nodal Communications Systems"; No. 5,177,714 to Ganter et al. on Jan. 5, 1993, entitled "Autonomous Radio Timepiece"; and No. 5,376,975 to Romero et al. on Dec. 27, 1994, entitled "Method and Apparatus for Preamble Battery Saving in Selective Call Receivers".

Transceivers which may possibly be utilized in conjunction with the present invention may be found in the following U.S. Pat. Nos. 5,248,905 to Kuo on Sep. 28, 1993, entitled "High Speed, Master/Slave Latch Transceiver Having a Directly-Driven Slave Stage"; and No. H1356 to McCormick et al. on Sep. 6, 1994, entitled "Bomb Sensor System".

Data packet transmission systems which may possibly be utilized in conjunction with the present invention may be found in the following U.S. Pat. Nos. 5,189,670 to Inglis on Feb. 23, 1993, entitled "Data Packet Transmission System Accommodating Different Substation Response Times"; No. 5,276,677 to Ramamurthy on Jan. 4, 1994, entitled "Predictive Congestion Control of High-Speed Wide Area Networks"; No. 5,280,498 to Tymes et al. on Jan. 18, 1994, entitled "Packet Data Communication System"; No. 5,293,378 to Shimizu on Mar. 8, 1994, entitled "Parallel Multi-Line Packet Transmission System"; No. 5,309,433 to Cidon et al. on May 3, 1994 entitled "Methods and Apparatus for Routing Packets in Packet Transmission Networks"; and No. 5,313,455 to van der Wal et al. on May 17, 1994, entitled "Transmission System with Recording of Untransmitted Packets".

Timing circuits which may possibly be utilized in conjunction with the present invention may be found in the following U.S. Pat. Nos. 5,203,024 to Yamao on Apr. 13, 1993, entitled "Antenna Selection Diversity Reception System"; No. 5,224,126 to Myer et al. on Jun. 29, 1993 entitled "Phase Ambiguity Resolution for Manchester-Encoded Data"; No. 5,231,314 to Andrews et al. on Jul. 27, 1993, entitled "Programmable Timing Circuit for Integrated Circuit Device with Test Access Port"; No. 5,285,483 to Ogawa et al. on Feb. 8, 1994, entitled "Phase Synchronization Circuit"; and No. 5,333,300 to Fandrich on Jul. 26, 1994, entitled "Timing Circuitry and Method for Controlling Automated Programming and Erasing of a Non-Volatile Semiconductor Memory".

Examples of Schottky diodes, which may be utilized in accordance with the embodiments of the present invention, may be found in the following U.S. Pat. Nos. 5,304,944, which issued to Copeland et al. on Apr. 19, 1994; No. 5,302,956, which issued to Asbury et al. on Apr. 12, 1994; and No. 5,301,048, which issued to Huisman on Apr. 5, 1994.

Examples of Zener diodes, which may be utilized in accordance with the embodiments of the present invention, may be found in the following U.S. Pat. Nos. 5,305,176, which issued to Hirota on Apr. 19, 1994; No. 5,276,350, which issued to Merrill et al. on Jan. 4, 1994; and No. 5,252,908, which issued to Brokaw on Oct. 12, 1993.

Examples of starburst or dot-matrix displays which may be utilized in accordance with the embodiments of the present invention may be found in the following U.S. Pat. Nos. 5,181,273, which issued to Ohtani on Jan. 19, 1993, entitled "Electronic Apparatus Having a Calendar-Display Function"; No. 5,210,708 to Negishi on May 11, 1993, entitled "Compact Electronic Calculator Equipped with Graphic Display Function"; No. 5,241,304 to Munetsugu and Hidaka on Aug. 31, 1993, entitled "Dot-Matrix Display Apparatus"; No. 5,313,293 to Hirakata et al. on May 17, 1994, entitled "Dot-Matrix Type Display Device"; No. 5,266,934 to Van Almen on Nov. 30, 1993, entitled "Alpha-Numerical Display Device"; and No. 5,321,800 to Lesser on Jun. 14, 1994, entitled "Graphical Language Methodology for Information Display".

Examples of communication software and computers with codes which may be utilized in accordance with at least one embodiment of the present invention may be found in the following U.S. Pat. Nos. 5,202,997 to Arato on Apr. 13, 1993 entitled "Device for Controlling Access to Computer Peripherals"; No. 5,327,436 to Miyazaki on Jul. 5, 1994, entitled "Communication Control System"; and No. 5,366,572 to Weiss on Nov. 22, 1994, entitled "Method and Apparatus for Personal Identification".

Examples of infrared transceivers or receivers which may be utilized in accordance with the present invention may be found in the following U.S. Pat. Nos. 5,189,287 to Parienti on Feb. 23, 1993, entitled "System for Inputting, Processing and Transmitting Information and Data"; No. 5,191,461 to Cranshaw at al. on Mar. 2, 1993, entitled "Infrared Network Transceiver Apparatus"; No. 5,214,422 to Cullimore on May 25, 1993, entitled "Remote Control and Signaling System"; No. 5,214,438 to Brusgard et al. on May 25, 1993 entitled "Millimeter Wave and Infrared Sensor in a Common Receiving Aperture"; and No. 5,218,641 to Abe and Kobayashi on Jun. 8, 1993, entitled "Wireless Receiver".

Examples of battery or power saving devices which may be utilized in accordance with the present invention may be found in the following U.S. Pat. Nos. 5,204,608 to Koenck entitled "Battery Pack Including Electronic Power Saver"; No. 5,230,084 to Nguyen on Jul. 20, 1993, entitled "Selective Cell Receiver Having Extended Battery Saving Capability"; No. 5,251,325 to Davis and Mittled on Oct. 5, 1993 entitled "Battery Saving Method and Apparatus for Providing Selective Receiver Power Switching"; and No. 5,369,798 to Lee on Nov. 29, 1994, entitled "Method and Circuit for Saving the Power of a Battery Used in a Portable Radio Telephone".

Examples of communication systems which could be utilized with the present invention may be found in the following U.S. Pat. Nos. 4,821,291 entitled "Improvements In or Relating to Signal Communications Systems"; No. 5,345,231 entitled "Contactless Inductive Data-Transmission System"; No. 5,374,815 entitled "Technique for Locating Electronic Labels in an Electronic Price Display System"; No. 5,172,314 entitled "Apparatus for Communicating Price Changes Including Printer and Display Devices"; and No. 4,500,880 entitled "Real-Time, Computer Driven Retail Pricing Display System".

The basic idea is to synchronize the receivers of the tags by means of suitable devices in such fashion that they all enter the Receive mode at the same time which coincides with the instant when the transceiver starts transmitting a preamble of a communications frame. Therefore, the transceiver needs only the period $T_{on}$ to transmit the preamble rather than the period $T_{on}+T_{off}$ because all tags enter the Receive mode synchronously, that is, at the same time, which ensures that they receive the data sent to them. Whilst in known systems non-addressed tags need to be in the Receive mode for an average period $0.5(T_{on}+T_{off})+T_c$, the system of the invention requires only the period $T_{on}+T_c$. For the updated tags to be in the Receive mode, only the period $T_{on}+T_d$ is needed, rather than the average period $0.5(T_{on}+T_{off})+T_d$ required by conventional systems.

The advantage of the present invention resides primarily in that the power requirement of the tags is substantially reduced because of the significantly reduced on-periods of the receiver, without adversely affecting the updating periods. The period of operation of the tags is reduced where like batteries are used; alternatively, batteries of reduced size and cost may be used while the useful life is maintained unchanged.

To synchronize the tags, an integrated internal clock proves suitable which activates the receiver for a predetermined period $T_{on}+T_c$ (unless it receives data addressed to the tag) or $T_{on}+T_d$, deactivating it for period $T_{off}$. Such a clock may be implemented with a quartz oscillator and commercially available circuitry.

If the tags were synchronized by means of an internal clock exclusively, this would entail the disadvantage that the clocks of all tags would have to be reset in a complex procedure, for example, when installing the system. In addition, a synchronized condition can only last for a certain period because of unavoidable tolerances of the frequency-determining elements (quartz oscillator). Therefore, it proves suitable to update the internal clocks of the tags regularly by means of the transceiver which then transmits synchronization signals. These signals may be contained in, precede, or follow the communications frames. For example, the preamble of a communications frame may serve as synchronization signal.

Tags may lose their synchronized condition in the event of transceiver breakdown or radio interference. Whilst it could be considered to operate the receivers of unsynchronized tags continuously, enabling them to be updated very quickly, the power consumption would be unnecessarily high, particularly in the event of a defective transceiver or continuous interference. It is therefore suggested to activate the receiver of an unsynchronized tag periodically until it receives a signal suitable for updating the internal clock, that is, a synchronization signal. To prevent the receiver from being only active when the transceiver is off (that is, for the period $T_{off}$), the period is suitably selected so it differs from the time elapsing between two synchronization signals. In this manner, the reception of a synchronization signal is ensured at least after a certain interval. It will be understood that this invention is not limited to any particular strategy for (re-)entering synchronization, that is, the selection of the period and the on-time of the unsynchronized receiver as well as of the time elapsing between two synchronization signals, although a quick synchronization with a minimum turn-on time is preferred. Further, it may also be envisaged to shorten the period between two consecutive synchronization signals from the transceiver if it receives a corresponding feedback from an unsynchronized tag.

Furthermore, it is suggested to update multiple tags in the same communications frame so as to further reduce the time that the tags on average need to be in the Receive mode. Data for different tags is thus transmitted in direct succession without the central computer waiting for each tag to respond. In conventional systems with N tags being updated in series, one after another, each tag is in Receive mode for, on average, a period $0.5N(T_{on}+T_{off})+(N-1)T_c+T_d$, whereas in this embodiment of the invention the receiver is required to be turned on for a substantially reduced period $T_{on}+T_d$ only. Period $T_d$ must be selected sufficiently long to be able to accommodate a correspondingly large number of data in the communications frame. To reduce power consumption, it will be an advantage to provide the tags with devices which turn the receivers off after they have received preamble of a communications frame, turning them on again when data addressed to them is being transmitted from the transceiver, so that the receivers are active for a minimum period only.

Advantageously, feedback signals from tags confirming that they have received correct data are sent to the computer at the end of a communications frame, that is, after transmission of date is complete, normally by means of electromagnetic waves, each tag being allocated a unique, predetermined window in time in which to respond. Because the central computer needs the feedback signals to establish whether the prices displayed are in conformity with the prices stored in its memory, each updated tag is required to send a confirmation signal within its allocated time slot, using equally electromagnetic (infrared or radio) waves for this purpose. The computer can readily recognize by the time when the confirmation signal is received which tag has responded and which tag has experienced transmission problems. In the latter case, the relevant data is again transmitted in the next sequential communications frame.

In a preferred embodiment of the present invention, the tags are divided into logical groups. All receivers within a group are synchronized to enter the Receive mode at the same instant, different groups turning on at different times. Considering that each group enters the Receive mode substantially less frequently, namely only at the instants allocated to it, a further reduction in the mean power consumption results. In a system with N tags divided into M groups having P tags each, each tag is in the Receive mode for, on average, $T_{on}+T_d$ until all tags are updated. This is a significant reduction from $0.5N(T_{on}+T_{off})+(N-1)T_c+T_d$ of conventional systems (which, as a rule, may be equated with $0.5NT_{off}$), because $T_{off}$ is substantially greater than $T_{on}$, $T_c$, and $T_d$.

The division of tags into groups can also be independent of the tags' position in the store and/or the type of article they price mark.

When combining this embodiment with the teaching of claims 5 and 7, the time taken to update a complete system of N tags is reduced from $N(T_{on}+T_{off}+T_c+T_d)$ in a conventional system to $MT_{on}+N(T_d+T_r)$ if all P tags are addressed in a data frame. This is an important result as it means that the period $T_{off}$ is no longer of relevance. This allows $T_{off}$ to be increased with a proportional reduction in the ration $T_{on}/(T_{on}+T_{off})$ which determines the power consumption of tags when not being updated.

In addition, the period in which a complete system (and, as indicated in the foregoing, also a single tag) is updated is reduced, allowing the off period $T_{off}$ to be increase by factor $[MT_{on}+N(T_d+T_r)]/(NT_{off})$ while the update speeds remain the same. When no tag is being updated, the power consumption of the receiver is reduced by about the same factor, dropping by factor $(T_{on}+T_d)/(0.5NT_{off})$, approximately, when all tags are being updated. In practice, these measures have the combined effect of reducing the power consumption of the receiver part of a tag by several orders of magnitude, such that it becomes insignificant as a part of the total operating current, irrespective of update frequency.

While price data is typically communicated in binary coded or binary coded decimal format from the computer to the tags, using as a rule a seven-segment display pattern, it is further recommended to communicate such data in a format in which one binary information item corresponds to one segment of the tag display elements. Thus, the central computer converts the numerical data to a seven-bit pattern corresponding to a seven-segment display, communicating it to the transceiver. The advantage resides in the extended display capabilities using conventional seven-segment displays: For example, the central computer may address the segments through the digits 0 to 9 such that non-numeric patterns or characters are represented. In a further embodiment, one or more starburst-segment displays involving 14 segments are utilized which, in addition to horizontally and vertically extending segments, include also diagonal segments. They may be used for the display of numeric digits as well as alphabetic characters. In yet another embodiment, dot-matrix displays may be used for displaying alphabetic characters, numeric digits, and any other non-alphanumeric symbols. Finally, customized symbols may be used, each addressed as one segment by means of a single bit.

In view of their low power requirements, liquid crystal displays (LCDs) are primarily utilized as display elements.

To supply the tags with power, accumulators and/or solar cells may be used as an alternative to batteries.

Finally, radio or infrared waves are proposed as a means of data communication.

One feature of the invention resides broadly in the an electronic labelling system, comprising a computer 1, a transceiver 2 connected thereto, as well as electronic tags 4 preferably fixed to shelves, said transceiver 2 transmitting, by means of electromagnetic waves 5, communications frames to update said tags 4, said frames holding the specific address 7 of a tag 4 as well as the data 8 to be displayed, said tags 4 incorporating a receiver which is periodically activated to receive the communications frames, characterized in that the tags 4 comprise devices for synchronizing the receivers, said devices activating the receivers at the same instant in time when a communications frame is being transmitted from the transceiver.

Another feature of the invention resides broadly in the system characterized in that the tags 4 comprise an internal clock to activate the receivers.

Yet another feature of the invention resides broadly in the system characterized in that the internal clock is updated by means of synchronization signals transmitted by the transceiver 2, said signals preceding, being contained in, or following the communications frames.

Still another feature of the invention resides broadly in the system characterized in that the receiver of an unsynchronized tag 4 is periodically activated until it receives a synchronization signal, the period being selected so it differs from the time elapsing between two synchronization signals.

A further feature of the invention resides broadly in the system characterized in that the computer 1 transmits data for different tags 4 in direct succession.

Another feature of the invention resides broadly in the system characterized in that the tags 4 are provided with devices which turn the receivers off after they have received the preamble 6 of a communications frame, turning them on again when data addressed to them is being transmitted from the transceiver 2.

Yet another feature of the invention resides broadly in the system characterized in that each tag 4 is allocated a unique time window 10 occurring subsequent to the transmission of data from the computer 1 to the tags 4, in which time window the tag 4 emits electromagnetic waves 5 to the computer 1 to confirm that it has received the data 8 addressed to it.

Still another feature of the invention resides broadly in the system characterized in that the tags 4 are divided into logical groups the receivers of which are synchronized, with the turn-on instants of the receivers of the tags 4 of different groups differing.

A further feature of the invention resides broadly in the system characterized in that the tags 4 are divided into logical groups independent of their position and/or the type of article they price mark.

Another feature of the invention resides broadly in the system characterized in that the transceiver 2 transmits data 8 to the tags 4 in which one binary information item corresponds to one segment of the display elements of the tag 4.

Yet another feature of the invention resides broadly in the system characterized in that the display elements are seven-segment and/or starburst and/or dot-matrix and/or customized displays.

Still another feature of the invention resides broadly in the system characterized in that the display elements of the tags 4 are liquid crystal displays.

A further feature of the invention resides broadly in the system characterized by seven-segment displays representing characters.

Another feature of the invention resides broadly in the system characterized in that the tags 4 are powered from batteries and/or accumulators and/or solar cells.

Yet another feature of the invention resides broadly in the system characterized in that data communication is by radio or infrared waves.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 39 074.2, filed on Nov. 2, 1994, having inventor Richard Altwasser, and DE-OS P 44 39 074.2 and DE-PS P 44 39 074.2, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Foreign patent publication application, namely, United Kingdom Patent Application No. 9309246.8, filed on May 5, 1993, having inventors Chris Escritt and Magnus Hellquist, as well as its published equivalent, and other equivalents or corresponding applications, if any, in corresponding cases in the United Kingdom and elsewhere, and the references cited in any of the documents cited therein, are hereby incorporated as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. An electronic labelling system comprising:

a computer, a transceiver connected to said computer, electronic tags preferably fixed to shelves, said transceiver transmitting, by means of electromagnetic waves, communications frames to update said tags and signals to synchronize said tags, said frames holding the specific address of a tag and the data to be displayed by that tag, each of said tags comprising a receiver which is periodically activated to receive the communications frames, said tags comprising devices for synchronizing said receivers to a transmission from said transceiver, said synchronizing devices comprising means for receiving a synchronization signal from said transceiver and means for synchronizing operation of said receivers with said transceiver, said synchronizing devices comprising means for transferring the synchronization signal received by said synchronization signal receiving means to said means for synchronizing operation of said receivers to synchronize said receivers with a communications frame transmitted from said transceiver, and said means for synchronizing operation of said receivers comprising means for activating the receivers with information from a previously received synchronization signal received from said transceiver at the time when a present communications frame is being transmitted from the transceiver.

2. A system as claimed in claim 1, wherein the computer transmits data for different tags in direct succession.

3. A system as claimed in claim 1, wherein said means for activating the receivers comprise an internal clock to activate the receivers.

4. A system as claimed in claim 2, wherein the internal clock is updated with information received from a previously received synchronization signal transmitted by the transceiver, said synchronization signal preceding, being contained in, or following the communications frames.

5. A system as claimed in claim 4, wherein said means for receiving a synchronization signal of an unsynchronized tag is periodically activated until it receives a synchronization signal from said transceiver, the activation period of said means for receiving a synchronization signal of an unsynchronized tag being selected to differ from the time elapsing between two synchronization signals transmitted by said transceiver.

6. A system as claimed in claim 3, wherein the computer transmits data for different tags in direct succession.

7. A system as claimed in claim 4, wherein the computer transmits data for different tags in direct succession.

8. A system as claimed in claim 5, wherein:

the computer transmits data for different tags in direct succession; and said means for activating the receivers with information from a previously received synchronization signal comprises means for activating the receivers at the same instant in time when a present communications frame is being transmitted from the transceiver.

9. A system as claimed in claim 8, wherein said means for activating the receivers comprise means for turning the receivers off after they have received a preamble of a communications frame, and means for turning the receivers on again when data addressed to them is being transmitted from the transceiver.

10. A system as claimed in claim 9, wherein each tag is allocated a unique time window occurring subsequent to the transmission of data from the computer to the tags, in which time window the tag emits electromagnetic waves to the computer to confirm that it has received the data addressed to it.

11. A system as claimed in claim 10, wherein the tags are divided into logical groups, said means for activating the receivers comprises means for activating the receivers of each logical group at a different time.

12. A system as claimed in claim 11, wherein the tags are divided into logical groups independent of at least one of their position and the type of article they price mark.

13. A system as claimed in claim 12, wherein the transceiver transmits data to the tags in which one binary information item corresponds to one segment of the display elements of the tag.

14. A system as claimed in claim 13, wherein:
the display elements are at least one of seven-segment displays, starburst displays, dot-matrix displays, liquid crystal displays and customized displays;
the tags are powered from at least one of batteries, accumulators, and solar cells;
data communication is by one of radio waves and infrared waves; and
said seven-segment displays represent characters.

15. An information display system for displaying information on shelves containing merchandise, said system comprising:
an information display arrangement;
said information display arrangement comprising a plurality of information display devices;
each of said plurality of information display devices being configured to be affixed to store shelves;
said information display arrangement comprising a receiving arrangement to receive initial information and to update information displayed by said information display arrangement;
said receiving arrangement comprising at least one receiving device to receive information from a source of information disposed a substantial distance from said information display arrangement;
said receiving arrangement comprising a memory arrangement to store information to be displayed on said information display arrangement;
each of said plurality of information display devices being configured to receive information stored in said memory arrangement;
a transmitter to transmit information and signals to synchronize said receiving arrangement to be received by said at least one receiving device;
said receiving arrangement comprising a synchronizing apparatus to synchronize said at least one receiving device to a transmission from said transmitter;
said synchronizing apparatus comprising an activation device to activate said at least one receiving device at a determined time corresponding to a time when said transmitter is transmitting information; and
said synchronizing apparatus comprising circuitry to change the determined time at which said activation device activates said at least one receiving device with information received from a previously received synchronization signal received from said transmitter.

16. The information display system according to claim 15, wherein said synchronizing apparatus comprises an arrangement to synchronize said at least one receiving device with said transmitter to change the determined time at which said activation device activates said at least one receiving device.

17. The information display system according to claim 16, wherein:
said at least one receiving device comprises a plurality of receiving devices; and
said activation device comprises an arrangement to activate each of said plurality of receiving devices at a corresponding determined time.

18. A method of operating an information display system for displaying information, such as, pricing information on shelves containing merchandise, said method comprising the steps of:
providing an information display arrangement having display units for being affixed to store shelves;
transmitting initial information and updated information from a transmitter;
receiving initial information and updated information to be displayed by the information display arrangement with a receiving arrangement;
said step of receiving initial information and updated information comprising the further step of receiving information with a receiving device from a source of information disposed a substantial distance from the information display arrangement;
storing information to be displayed on the information display arrangement in a memory arrangement;
receiving information stored in the memory arrangement with the display units;
synchronizing the receiving device to a transmission from the transmitter; and
said step of synchronizing the receiving device comprising the further steps of:
activating the receiving device at a determined time when information is being transmitted from the transmitter with an activation device;
receiving a synchronization signal from the transmitter; and
changing the determined time at which the activation device activates the receiving device with information received from a previously received synchronization signal received from the transmitter.

19. The method of operating an information display system according to claim 18, wherein said step of synchronizing the receiving device comprises the further step of synchronizing the receiving device with said transmitter to change the determined time at which the activation device activates the receiving device.

20. The method of operating an information display system according to claim 19, wherein:
said receiving device comprises a plurality of receivers; and
said step of activating the receiving device comprises the further step of activating each of the plurality of receivers at a corresponding determined time.

* * * * *

UNITED STATES PATENT AND TRADEMARK OFFICE
CERTIFICATE OF CORRECTION

PATENT NO.   : 5,797,132
DATED        : August 18, 1998
INVENTOR(S)  : Richard ALTWASSER It is certified that error appears in the above-identified patent and that said Letters Patent is hereby corrected as shown below:

On the title page, item [73], after 'Pricer AB,', delete "Upsala," and insert --Uppsala--.

On the title page, item [56], under the OTHER PUBLICATIONS section, add the following reference: --"Verteilte Zeiten", Frank Kadel, February, 1993, pages 144-151--.

In column 11, lines 22-23, before 'et al.', delete "Fernandos" and insert --Fernandes--.

In column 11, line 37, after 'and', delete "Yonsda" and insert --Yoneda--.

Signed and Sealed this

Eighteenth Day of January, 2000

Attest:

Q. TODD DICKINSON

*Attesting Officer*  *Commissioner of Patents and Trademarks*